Feb. 9, 1960 J. E. MORSE 2,924,534

METHOD FOR THE PRODUCTION OF A METALLIC PRINTING MEMBER

Filed July 5, 1955

INVENTOR
John E. Morse

BY Kenyon & Kenyon
ATTORNEYS

Patented Feb. 9, 1960

2,924,534

METHOD FOR THE PRODUCTION OF A METALLIC PRINTING MEMBER

John E. Morse, Brooklyn, N.Y.

Application July 5, 1955, Serial No. 519,953

4 Claims. (Cl. 117—5.5)

This invention relates to the production of metallic printing members such as plates or cylinders.

According to this invention a convenient, economical and accurate method is afforded for depositing in areas of predetermined outline on a printing member presenting a zinc surface a chemically deposited durable metal layer having preferential affinity for printing ink as compared with the portions of the zinc surface that remain exposed.

The method of this invention may be advantageously utilized for the production of printing plates for planographic or lithographic printing. In planographic or lithographic printing a printing plate is employed having a substantially flat surface presenting a succession of areas which have different preferential selective attraction for printing ink and for water. The areas having preferential selective attraction for printing ink are of predetermined outline such as letters, designs, half tone prints or the like which are commonly referred to as the image areas. By first applying water to the plate the surface areas having preferential affinity for water become moistened and upon subsequently applying printing ink the ink does not adhere to the surface areas having preferential affinity for water while it does adhere as a coating upon the image areas of predetermined outline having a preferential affinity for the ink. Upon application of the inked printing member to the surface of a paper sheet, for example, printing conforming to the image areas of predetermined outline is transferred to the paper.

In the preparation of printing plates for planographic or lithographic printing, plates presenting a surface of aluminum or zinc have been extensively used due to the fact that these metals, especially after having been subjected to mechanical or chemical graining, exhibit a pronounced preferential attraction for water as compared with printing ink. This affinity for water is further improved by etching the plate with a lithographic etch such as gum arabic solution and phosphoric acid which leaves a deposit or film that accentuates still further the preferential affinity for water. In the past plates presenting a surface of zinc or aluminum have been electrolytically plated all over with copper and the copper plating has thereafter been etched away in those areas other than the desired image areas. In this way a layer of copper is provided in the image areas which exhibits a preferential affinity for printing ink, the balance of plate consisting of the exposed aluminum or zinc. While satisfactory plates may be made in this way the process is a difficult one to carry out as a commercial operation and plates so produced are very expensive. Moreover, special electroplating equipment is required.

Heretofore printing plates of the character aforesaid which present a zinc surface have been made so as to carry printing areas composed of a lacquer base that is receptive to greasy printing inks. However, when the image areas are composed of lacquer they do not resist wear as well as when the image areas are composed of a metal such as copper that is substantially harder than the zinc metal base.

Because of the foregoing circumstances there has been a need for a printing plate of the character referred to herein which presents a zinc surface and which has greater durability as compared with the use of lacquer base image areas and which may be much more economically and conveniently produced as compared with plates produced by overall electroplating followed by etching away the copperplating in the non-image areas. For fulfilling this need attempts have been made heretofore to form copper image areas on a printing plate presenting a zinc surface by chemical deposition in a manner which has been successfully used in the production of copper image areas on an aluminum plate. However, such attempts have been unsuccessful when the metal surface is composed of zinc due to the fact that such deposit of copper as is formed does not possess the preferential selective receptivity for greasy printing ink that is required in practical printing operations. While it is possible to deposit a layer of copper on a zinc surface by chemical means, the reaction by which the copper layer is deposited tends to stop as soon as an extremely thin layer of copper has been formed. It is not definitely understood why the layer of copper, even though thin, is not suitable for providing the desired selective attraction for greasy printing ink. Thus it may be that the coating which is formed is excessively porous. Also, it may be the case that the zinc tends to blend with the copper to form some alloy which possesses substantially less preferential selective receptivity for greasy printing ink as compared with copper alone. The metal layer which forms the image areas must be firm and hard and likewise must be such as to possess the desired preferential selective receptivity for greasy printing ink and must retain such preferential receptivity during use of the printing plate. However, when copper is deposited on a printing plate presenting a zinc surface to produce image areas the image areas do not exhibit the properties required for successful commercial operation.

It is a purpose of this invention to overcome difficulties of the character aforesaid and to provide a method whereby a printing plate suitable for such uses as planographic or lithographic printing may be easily and inexpensively manufactured by steps involving the application of metal image areas to a printing plate presenting a zinc surface. It is a further object of this invention to provide in the manner stated a printing plate presenting a zinc surface which exhibits desirable selective receptivity for greasy printing ink in the image areas and for water in the other areas during prolonged periods of use.

According to this invention it has been discovered that whereas a satisfactory layer of copper cannot be produced on the zinc surface by chemical deposition containing copper alone, a much superior printing plate can be obtained by the employment of a solution which not only contains a copper salt selected from the group consisting of copper chloride and copper nitrate but also at least one other salt selected from the group consisting of the chlorides and nitrates of nickel, chromium, cobalt and titanium. The metal that I preferably employ in combination with the copper is nickel.

In the practice of this invention a printing member such as a plate or cylinder which presents a zinc surface is first covered with a suitable masking material except for areas or openings of predetermined outline which are left exposed. The areas or openings of predetermined outline, as stated above, may be in the form of letters, a design, a half tone print or the like depending on the subject matter to be printed. Preferably a suitable etch solution is next applied to the exposed zinc surface so as to more effectively prepare it for the reception of the metal layer deposited thereon from solution by chemical means. The solution is applied while the masking material remains intact and after the metal deposit has been formed the masking material is removed. Further details as to the steps employed will be exemplified hereinbelow.

In order to afford a better understanding of the practice of this invention it will now be described in connection with a specific example of the practice thereof in the production of a zinc plate suitable for planographic or lithographic printing of a photographic image. The image to be reproduced may be originally produced in the usual way by first preparing a photographic negative and then a half tone positive through a half tone screen. A zinc plate of the type that is conventionally employed in lithographic printing is suitable. Preferably the surface of the plate is mechanically grained, but it can be used ungrained if the surface has been thoroughly cleaned.

The surface of the zinc plate that is to be used for printing is coated with a layer of dichromated gum arabic sensitive to light. A formula for this purpose which is extensively used is as follows:

| | | |
|---|---|---|
| Water | cc. | 1000 |
| Ammonium hydroxide (28%) | cc. | 90 |
| Ammonium bichromate | grams | 90 |
| Gum arabic (sufficient to provide 14.5° Bé.) | grams | 280 |

The foregoing formula is typical of what is commonly known as a "deep etch" sensitizer coating, due to the fact that it stands up under the action of etching solutions. After the sensitizer coating has been applied the coating is exposed to light through the positive so as to produce light-exposed areas and areas unexposed to light which correspond to the image on the positive, and the coating is treated with a solution which is adapted to dissolve away the image areas of the coating that have not been exposed to light leaving the light-exposed areas intact. For this purpose there may be used a developer solution of alkaline earth salt such as calcium chloride and an organic acid such as lactic acid, e.g., a solution consisting of 1000 cc. of 37° Bé. calcium chloride and 40 cc. of lactic acid is suitable for the purpose. The calcium chloride acts as a carrier which prevents solution of the light-exposed areas of the coating while the lactic acid dissolves away the image areas that were unexposed to light. Frequently after exposure and prior to development the sensitizer coating is examined for minor imperfections and flaws and any such are touched up with shellac so as to insure the overall imperviousness of the coating.

As aforesaid, it is preferable to etch the zinc surface which has been exposed by the removal of the deep etch sensitizer masking coating from the image areas to predetermined outline and when this step is employed an etching solution is applied to the zinc surface of the plate, which is exposed in the printing or image areas but is covered with the deep etch sensitizer coating in the non-printing areas, a suitable formula for the purpose being as follows:

| | | |
|---|---|---|
| Calcium chloride solution 40° Bé. | cc. | 1000 |
| Nickel chloride | grms. | 20 |
| Hydrochloric acid (C.P. sp. gr. 1.19) | cc. | 6 |

The desired etching may be obtained in a single application of the etching solution which is maintained in contact with the exposed image areas for about three minutes. The duration of the application may vary somewhat, depending principally upon the temperature. The etching solution attacks the exposed image areas of the zinc surface of the plate and its function is primarily that of bringing the plane of the image areas slightly below the plane of the rest of the plate while at the same time depositing an extremely thin layer of nickel as a stain on the image areas which renders them more receptive to the subsequent step of depositing thereon by chemical deposition the desired ink receptive metal coating layer.

The etched plate, the masking coating or stencil of deep etch sensitizer coating still intact, is next washed thoroughly with alcohol to remove essentially completely the etching solution. At this point the plate preferably is reexposed to arc lamps to further harden the masking coating or stencil, especially in those areas wherein any spots were shellacked out.

The plate having been prepared by the steps exemplified hereinabove is next subjected to the plating solution, which may be applied merely by pouring it on the plate and swabbing it over the plate for about two minutes, the time required for producing the most desirable results depending somewhat on the prevailing conditions of temperature and humidity. A preferred plating solution used for the chemical deposition consists of

| | | |
|---|---|---|
| Nickel chloride ($NiCl_2.6H_2O$) | grms. | 10 |
| Cupric chloride ($CuCl_2$) anhydrous reagent grade | grms. | 15 |
| Ethyl alcohol (anhydrous) | cc. | 40 |
| Isopropyl alcohol (99%) sufficiently to make 1000 cc. | | |

In connection with plates presenting large solid areas, a second application of the plating solution may be desirable.

After the chemical deposition has been effected some alcohol, e.g., ethyl alcohol, is poured onto the plate and swabbed over the plate for another minute or so. Thereafter the plate is thoroughly cleaned using several applications of the alcohol.

While the plate is wet with alcohol the presence of the alcohol minimizes oxidation of the metal layer that has been deposited on the image areas from the plating solution. It is desirable to prevent such oxidation which tends to attack the deposited metal and reduce its preferential receptivity for printing ink. Accordingly it is preferable while the plate is still wet with the alcohol to protect the surface of the deposited metal layer by application of suitable materials thereto. Thus in typical practice the plate while still wet with alcohol is caused to receive an application of regular deep etch lacquer which covers and protects the metal in the image areas. Moreover, the application and rubdown of the deep etch lacquer may be followed by similar successive applications of asphaltum and developing ink.

The plating by chemical deposition and the protection of the metal layer deposited having been completed, the plate may now be thoroughly washed with water on both the face and the back. The masking coating or stencil may then be removed as by soaking the plate in water to soften the stencil and then scrubbing the plate gently to remove the softened stencil material. After the stencil has been removed from the plate the metal layer which has been deposited in the image areas may, if desired, be further protected as by rubbing up the plate with greasy ink and likewise subjected to rolling using greasy ink, thereby further protecting the image and removing any imperfections from the background. The protecting films thus applied to the metal layer deposited on the image areas gradually wear off during use of the plate without, however, imparing the utility of the plate. As aforesaid, the preferential affinity for water between the exposed zinc areas and the metal plating in the image areas may be enhanced by application to the exposed zinc areas of a usual type of desensitizer etch such as a solution containing gum arabic and phosphoric acid. The protective films applied to the metal at the image areas effectively protect the metal from the desensitizer etch solution.

Whether or not a desensitizer etch is applied to the non-printing areas, these areas are referred to herein and in the claims as zinc surface that is water receptive and exposed, thereby distinguishing from the printing or image areas of the finished plate which have deposited thereon the adherent metal coating layer that is receptive of printing ink rather than water.

The sequence of steps employed according to the above described example of the practice of this invention is indicated diagrammatically in the accompanying drawing wherein each of Figs. 1 to 4 is a cross section of a printing plate as it occurs at different points in the processing.

In Fig. 1 a zinc plate 10 is shown with a coating 11 of light-sensitive dichromated gum arabic applied thereto, the thickness being exaggerated for clarity in this figure as well as in the other figures.

Figure 1:
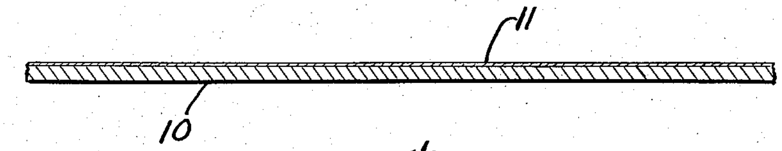
Figure 2:
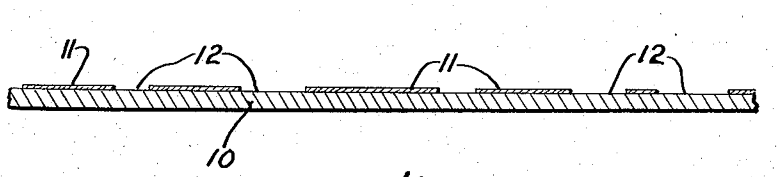
Fig. 2 illustrates the condition of the coated plate after the layer 11 has been exposed to light through the positive and after the areas unexposed to light corresponding to the image areas on the positive have been removed leaving the exposed areas 12 of predetermined outline.
Figure 3:
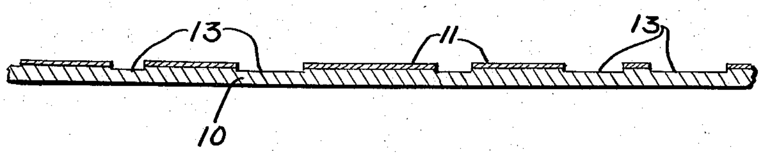
Fig. 3 illustrates the condition of the plate after the plate has been etched in the image areas to a plane slightly below the balance of the surface that is protected by the masking coating or stencil areas 11.
Figure 4:
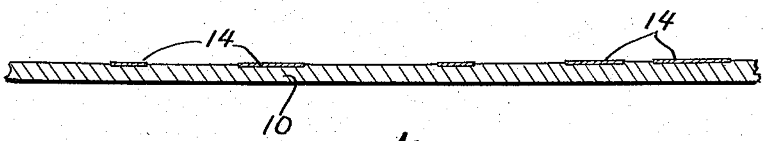
Fig. 4 illustrates the condition of the plate after the ink receptive coating layer of metal 14 has been applied to the image areas by chemical deposition and after the masking coating or stencil has been removed from the areas covered thereby that are shown in Figs. 2 and 3.

After the plate has been produced in the condition shown in Fig. 4 it may be subjected to the finishing operations that have been described hereinabove. In the finished plate the deposited metal layer has excellent preferential affinity for printing ink and retains these properties during prolonged periods of usage. It is to be noted that these desirable properties or characteristics are obtained by very simple operations which merely require the application of certain solutions and without the necessity for special processing equipment or time-consuming operations.

The printing plates which are used for planographic or lithographic printing in the practice of this invention are ordinarily in the form of relatively thin zinc plates or other sheetlike bodies that can be secured to the surface of a printing cylinder. However, it is apparent that printing plates suitable for use in a platen printing press can be produced according to this invention. Moreover, the process of this invention also is applicable directly to the surface of a printing cylinder.

While the practice of this invention has been illustrated in connection with the preparation of a printing plate from a photographic positive utilizing a light-sensitive coating, it is apparent that this invention can be practiced in other ways and that all that is required is a suitable masking coating applied over the surface of a printing plate presenting a zinc surface, the coating being resistant to the solutions thereafter applied and having openings therein through which the solutions thereafter applied may act on the areas of the plate wherein the zinc surface remains exposed. For example, openings having the predetermined outline for the image areas could, if desired, be produced mechanically in a masking or stencil coating. If the openings are produced mechanically, it is of course the case that the masking coating need not be light-sensitive and may, for example, be a suitable lacquer or enamel. Moreover, any other means may be employed for contacting the plating solution with selected areas only of the zinc surface of the plate that have the desired predetermined outline.

In the example hereinabove described the exposed areas of the zinc surface were treated with an etching solution prior to treatment with the plating solution. It is possible to dispense altogether with the etching step and the chemical deposition may be effected directly after the openings of predetermined outline have been produced in the masking or stencil coating. However, a firmer deposit of the metal layer is formed by the preliminary use of an etching solution.

For etching the image areas of the zinc surface of the plate a variety of known etching solutions may be employed other than the etching solution hereinabove mentioned as typical of preferred practice of this invention. It is preferable to employ as the active etching agent, or to incorporate with another active etching agent such as hydrochloric acid, a salt of a metal which during the etching is deposited to an appreciable extent as a stain on the etched areas of the zinc surface so as to protect the etched surface and so as to leave a deposit which promotes an adherence of the chemically deposited metal layer in the image areas. The metal salt which I prefer to use is nickel chloride. However, other metallic salts can also be used such as iron chloride that is commonly used for deep etching lithographic printing plates. More generally, any soluble salt may be used wherein the cation is a metal that is below zinc in the electromotive force series for metals, the anion of the salt being the anion of a strong mineral acid such as hydrochloric acid. Salts of the nature aforesaid can be used as the sole etching agent, although preferably some hydrochloric acid or other strong acid is also present to speed up the etching action.

While it is preferable to employ an etching solution that leaves a stain deposited on the exposed zinc surface having the outline of the image areas, the exposed areas can, if desired, be etched only with an acid such as hydrochloric acid. Whether or not an etching solution is used containing a salt that leaves a stain-like metal coating, the etched zinc surface is referred to herein and in the claims as exposed zinc surface, as contrasted with the areas of the zinc surface that are covered with the stencil or masking coating that prevents any deposit of nickel on the plate surface in these areas by chemical deposition from the plating solution.

In the etching solution hereinabove described the calcium chloride acts as a carrier to prevent the solution of the light-exposed gum arabic coating. Other water soluble salts of alkaline earths may also be used for this purpose. If some masking coating other than one having a gum arabic base is used, e.g., lacquer or enamel as above mentioned, which is not dissolved by aqueous solutions, then the calcium chloride or the equivalent is not required to be present.

In the plating solution the concentrations of the copper and nickel salts may be varied relatively widely. It is desirable that there should be present at least about 0.15% by weight of copper salt and at least about 0.1% by weight of nickel salt. Depending on the solubility in the solvent employed, the concentrations may be increased, but it is desirable that the concentration of the copper salt be not greater than about 18% by weight and that the concentration of the nickel salt be not greater than about 12% by weight. Preferably, the concentration of the copper salt is not greater than about 10% and the concentration of the nickel salt is not greater than about 5% by weight of the solution. The foregoing percentages are on the basis of the anhydrous salt content of the solution. The relative proportions of the copper salt and the nickel salt are such that the nickel is present in an amount effective to effect substantial improvements of the nature hereinabove mentioned as compared with attempted chemical deposition of copper alone. It is normally desirable that the proportions be varied between about five parts by weight of the copper salt to about one part by weight of the nickel salt and about one part by weight of the copper salt to about three parts by weight of the nickel. It is preferable that the major portion of the mixture of copper salt and nickel salt shall consist of the copper salt.

In addition to cupric chloride, cuprous chloride also may be employed. The term "copper chloride" is used herein and in the claims to refer to both cuprous chloride and cupric chloride. Copper nitrate likewise may be employed.

With regard to the metal salt other than the copper salt which likewise is employed according to this invention nickel chloride and nickel nitrate are preferred. However, substantial improvements as compared with the use of a copper salt by itself are afforded when in addition to the copper salt there is employed at least one substance selected from the group consisting of the chlorides and nitrates of chromium, cobalt and titanium. The proportions and relative proportions hereinabove mentioned in connection with the use of cupric chloride and nickel chloride also are applicable when the alternative salts hereinabove mentioned are used in the practice of this invention. The proportion of the salt other than the copper salt may consist of a single salt selected from the salts above mentioned or may consist of two or more of these salts.

In order that the reaction for depositing the metal coating layer may provide the desired preferential affinity for printing ink, it should take place utilizing substantially anhydrous solvent for the salts. The solvents preferably used are ethyl alcohol and isopropyl alcohol either alone or in combination. When using ethyl alcohol the reaction by which the metal layer is produced is more rapid and the solubility of both the copper and nickel salts is greater in this alcohol. Other alcohols likewise may be employed for the plating solution such as hexyl alcohol, diacetone alcohol, a mixture of ethyl alcohol with hydroabietyl alcohol. Other anhydrous solvents or solvent mixtures may be employed in addition to the alcohols. Thus ethyl and methyl Cellosolve provide very desirable solvents either when used alone or in combination with the alcohols. Organic fluids such as benzene, turpentine and kerosene may also be used with alcohol and may function either as a diluent or for the purpose of controlling the speed of the reaction. Propylene glycol likewise is a possible solvent. More generally, any organic liquid vehicle may be employed which is a solvent for the salts employed and is substantially anhydrous. If more than a small amount of water is present there is such excessive reactivity with the zinc as to preclude the formation of a metal layer in the image areas having the desired impermeability, durability and affinity for greasy printing ink.

The precise nature of the metal layer that is deposited by chemical deposition in the image areas is not definitely understood. Thus it has not as yet been determined in what precise form the metals become deposited although it appears that there is an interaction of grain formation that is responsible at least in part for the beneficial results that have been obtained according to this invention. However, whatever the principle of the action may be, it has been found that by the employment of the second metal such as nickel according to this invention a metal layer is produced which is fine grained and impervious, which has a very high affinity for greasy printing ink and which is built up with such thickness as to provide a high degree of durability in the finished plate. Without the presence of the second metal these results are not obtained and it is not possible on a plate presenting a zinc surface to produce a satisfactory metal coating for planographic and lithographic purposes.

I claim:

1. In the production of a metallic printing member presenting a zinc surface that is water receptive in certain areas and is coated in other areas of predetermined outline with a metal coating layer having greater affinity for printing ink than said zinc surface, the steps comprising covering the zinc surface presented by said printing member with a masking coating containing openings therein defining exposed areas of said zinc surface having said predetermined outline and depositing on said exposed areas of said zinc surface an adherent metal layer by chemical deposition from a substantially water-free solution in contact therewith which contains dissolved in a substantially anhydrous liquid organic solvent therefor a copper salt selected from the group consisting of copper chloride and copper nitrate and at least one other salt selected from the group consisting of the chlorides and nitrates of nickel, chromium, cobalt and titanium, said solution containing from about 0.15% to about 18% by weight of copper salt content as aforesaid and from about 0.1% to about 12% by weight of the aforesaid salt content other than said copper salt, and the weight ratio of said copper salt content to the content of aforesaid salt other than copper salt being in the range from 5:1 to 1:3.

2. In the production of a metallic printing member presenting a zinc surface that is water receptive in certain areas and that is coated in other areas of predetermined outline with a metal coating layer having greater affinity for printing ink than said zinc surface, the steps comprising covering the zinc surface presented by said printing member with a masking coating containing openings therein defining exposed areas of said zinc surface having said predetermined outline, etching said exposed zinc surface while said masking coating remains in place to a plane slightly lower than the plane of said zinc plate that is coated with said masking coating, and while said masking coating remains in place depositing on said etched areas an adherent metal coating layer by chemical deposition from a substantially water-free solution in a substantially anhydrous liquid organic solvent therefor of a copper salt selected from the group consisting of copper chloride and copper nitrate and at least one other salt selected from the group consisting of the chlorides and nitrates of nickel, chromium, cobalt and titanium, the weight ratio of the content of the aforsaid copper salt to the content of the aforesaid salt other than copper salt being from about 5:1 to about 1:3.

3. In the production of a metallic printing member presenting a zinc surface that is water receptive in certain areas and is coated in other areas of predetermined outline with a metal coating layer having a greater affinity for printing ink than said zinc surface, the steps comprising etching said areas of predetermined outline with an etching solution containing a salt the cation of which is a metal below zinc in the electromotive force series and the anion of which is an anion of a strong mineral acid to etch said areas and deposit said metal of said salt thereon as a thin, stain-like layer that protects said areas and makes them more receptive to said metal layer and thereafter depositing on said areas carrying said stain said metal layer by chemical deposition from a substantially water-free solution in contact therewith which contains dissolved in a substantially anhydrous liquid organic solvent therefor a copper salt selected from the group consisting of copper chloride and copper nitrate and at least one other salt selected from the group consisting of the chlorides and nitrates of nickel, chromium, cobalt and titanium, the content of the aforesaid copper salt in said solution being from about 0.15% to about 18% by weight and the content of the aforesaid salt other than copper salt being from about 0.1% to about 12% by weight and the weight ratio of the content of the aforesaid copper salt to the content of the aforesaid salt other than copper salt being in the range between about 5:1 and about 1:3.

4. In the production of a metallic printing member presenting a zinc surface that is water receptive in certain areas and is coated in other areas of predetermined outline with a metal coating layer having a greater affinity for printing ink than said zinc surface, the steps comprising etching said areas of predetermined outline with an etching solution containing a salt the cation of which is a metal below zinc in the electromotive force series and the anion of which is an anion of a strong mineral acid to etch said areas and deposit said metal of said salt thereon as a thin, stain-like layer that protects said areas and makes them more receptive to said metal layer and thereafter depositing on said areas carrying said stain said metal layer by chemical deposition from a substantially water-free solution in contact therewith which contains dissolved in a substantially anhydrous liquid alcoholic solvent therefor a copper salt selected from the group consisting of copper chloride and copper nitrate and a nickel salt selected from the group consisting of nickel chloride and nickel nitrate, the ratio of the content of aforesaid copper salt to the content of the aforesaid nickel salt being between about 5:1 and about 1:1, the content of the aforesaid copper salt being from about 0.15% to about 10% by weight and the content of the aforesaid nickel salt being from about 0.1% to about 5% by weight.

References Cited in the file of this patent

UNITED STATES PATENTS

| | | |
|---|---|---|
| 748,004 | Pancoast | Dec. 29, 1903 |
| 1,163,166 | Niemeyer | Dec. 7, 1915 |
| 2,437,005 | Schwarz | Mar. 2, 1948 |
| 2,506,164 | Morse | May 2, 1950 |
| 2,560,979 | Pessel | July 17, 1951 |
| 2,676,886 | Barbarite | Apr. 27, 1954 |
| 2,703,295 | Kantrowitz et al. | Mar. 1, 1955 |